T. D. POWERS.
Cheese-Presses.

No. 153,981. Patented Aug. 11, 1874.

Attest:
G. Van Schewen
G. S. Doesburg

Inventor:
Thomas D. Powers

UNITED STATES PATENT OFFICE.

THOMAS D. POWERS, OF HOLLAND, MICHIGAN.

IMPROVEMENT IN CHEESE-PRESSES.

Specification forming part of Letters Patent No. 153,981, dated August 11, 1874; application filed April 29, 1874.

*To all whom it may concern:*

Be it known that I, THOMAS D. POWERS, of Holland, in the county of Ottawa, in the State of Michigan, have invented a new and useful Novelty Cheese-Press; and I do hereby declare that the following is a full and exact description thereof, reference being had to the accompanying drawings and to the letters of reference marked thereon making a part of this specification.

Figure 2:
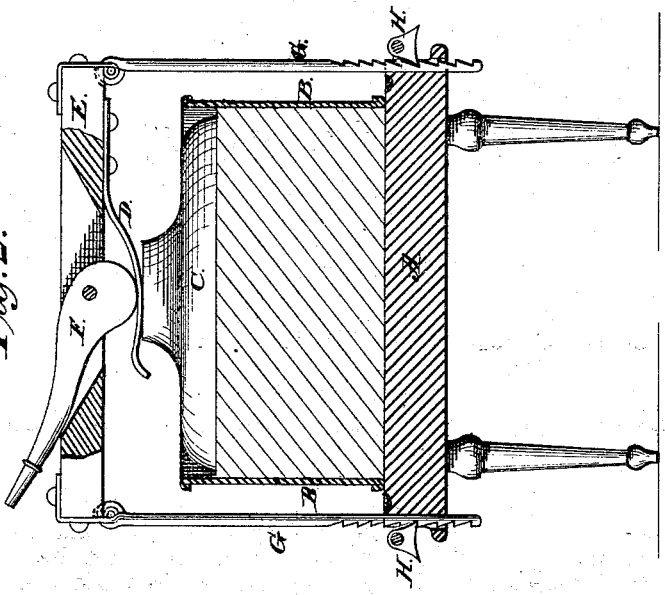
Figure 1:
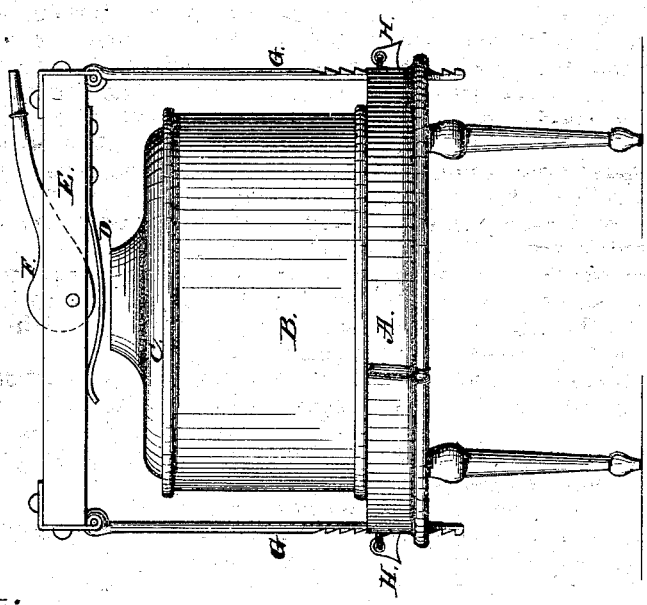

Figure 1 shows the cheese-press complete, all the parts working together when in use. Fig. 2 shows the cheese-press when packed.

A is the stool or cheese-board on its legs; B, the hoop; C, the follower; D, the spring; E, the cross-bar; F, the eccentric levers; G G, the ratchet-rods; H H, the catches.

The nature of my invention consists in a machine for pressing cheese by means of ratchets, catches, a cross-bar, and lever attachments.

To enable others skilled in the art to make and use my invention, I will proceed to describe its construction and operation.

I construct a stool with a channel near the edge, and a groove to carry off the whey. On the edge, opposite of each other, I place a device with reversible catches. I construct a hoop of wood or metal, and a follower to fit the same. I make a cross-bar with a slot. In the slot I bolt an eccentric lever. Underneath the lever I attach a spring, which gives a gradual pressure on the follower, and serves as a slide for the lever. On each end of the cross-bar I attach a hinged ratchet-rod to connect with the catches on the stool. I now place the hoop on the stool, place in the curd, put the follower in place, with the cross-bar on the top, insert the rods in place and press them firmly down, where they are held by the catches. When greater pressure is desired I apply the lever.

In packing, the hoop may be placed within the legs, and held there by the cross-bar, as shown in the drawings making a part of this specification.

What I claim as my invention, and desire to secure by Letters Patent, is—

The combination of the base A, cheese-box B, follower C, cam-lever F, spring D, ratchet-bars G, and double pawls H, as and for the purpose described.

THOMAS D. POWERS. [L. S.]

Witnesses:
G. VAN SCHEWEN,
G. S. DOESBURG.